J. A. KAYLOR.
MANDRELS FOR WELDING PIPE.

No. 184,385.   Patented Nov. 14, 1876.

Witnesses
Charles M. Roberts
A. McMurdy

Inventor
Joseph A. Kaylor
Per O. D. Levis his
attorney.

UNITED STATES PATENT OFFICE.

JOSEPH A. KAYLOR, OF PITTSBURG, PENNSYLVANIA, ASSIGNOR TO JOHN B. SCHMITT, OF SAME PLACE.

IMPROVEMENT IN MANDRELS FOR WELDING PIPE.

Specification forming part of Letters Patent No. 184,385, dated November 14, 1876; application filed July 27, 1876.

*To all whom it may concern:*

Be it known that I, JOSEPH A. KAYLOR, of Pittsburg, in the county of Allegheny and State of Pennsylvania, have made certain new and useful Improvements in Mandrels for Welding Pipe; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
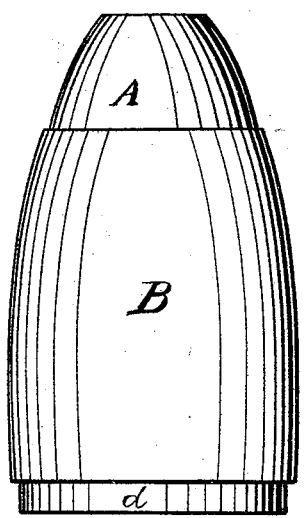
Figure 2:
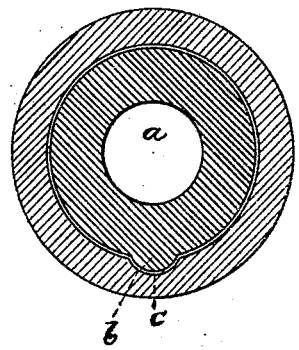

Figure 1 is a side elevation of my improved mandrel, and Fig. 2 is a cross-section of the same.

Similar letters of reference indicate corresponding parts in both the figures.

The object of my invention is to economize in the manufacture of mandrels for welding metal pipe; and it consists in arranging upon a solid core or body a removable sleeve, which, when worn out, may be readily detached and replaced by another, substantially as hereinafter more fully described.

In the drawing, A is the central core or body of my improved compound mandrel. This consists of a cylindrical block of metal, tapering at one end, so as to admit of its being easily inserted into a pipe, and having a central perforation, $a$, in which a handle may be adjusted. The body A has upon its outside a longitudinal rib or ridge, $b$, cast in one piece with it. B is a metallic sleeve, fitting upon body A, and having a groove or channel, $c$, which, fitting upon rib $b$, prevents the sleeve from turning or being displaced. Body A has at its lower end a circumferential rim or shoulder, $d$, which prevents the sleeve from sliding off when being inserted into the pipe.

From the foregoing description the nature of my invention and its operation and advantages will be readily understood. The core or body A, being protected from wear by the sleeve B, will last for an indefinite period of time, while the sleeve B, when worn out or damaged, may be easily removed and replaced by another at a trifling cost. It is obvious that the construction of the core A herein described is not essential to the successful operation of my invention. It may thus, for instance, be square, or it may, instead of a rib, $b$, have a groove, the sleeve B being, of course, in every case constructed correspondingly.

Having thus described my invention, I claim and desire to secure by Letters Patent of the United States—

A compound mandrel, consisting of a body, A, and removable sleeve B, substantially as and for the purpose herein shown and specified.

JOSEPH A. KAYLOR.

Witnesses:
O. D. LEVIS,
CHARLES M. ROBERTS.